(12) United States Patent
Trainer et al.

(10) Patent No.: US 11,063,527 B2
(45) Date of Patent: Jul. 13, 2021

(54) CONVERTER

(71) Applicant: ROLLS-ROYCE plc, London (GB)

(72) Inventors: David R. Trainer, Derby (GB); Ellis F H Chong, Derby (GB); Zhigang Sun, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/570,739

(22) Filed: Sep. 13, 2019

(65) Prior Publication Data

US 2020/0099312 A1   Mar. 26, 2020

(30) Foreign Application Priority Data

Sep. 20, 2018 (GB) ..................................... 1815301

(51) Int. Cl.
  *H02M 7/217* (2006.01)
  *H02M 7/23* (2006.01)
  *H02M 7/25* (2006.01)

(52) U.S. Cl.
  CPC .......... *H02M 7/2173* (2013.01); *H02M 7/23* (2013.01); *H02M 7/25* (2013.01)

(58) Field of Classification Search
  None
  See application file for complete search history.

(56) References Cited

U.S. PATENT DOCUMENTS

| | | | | |
|---|---|---|---|---|
| 6,459,596 | B1 * | 10/2002 | Corzine | H02M 5/4585 363/127 |
| 10,770,987 | B2 * | 9/2020 | Kumar | H02M 7/49 |
| 2006/0056209 | A1 | 3/2006 | Blidberg et al. | |
| 2006/0245216 | A1 * | 11/2006 | Wu | H02M 7/487 363/13 |
| 2007/0223258 | A1 * | 9/2007 | Lai | H02M 7/797 363/37 |
| 2016/0141870 | A1 * | 5/2016 | Hasegawa | H02M 7/44 307/77 |

(Continued)

FOREIGN PATENT DOCUMENTS

| | | |
|---|---|---|
| AU | 6889694 A | 7/1995 |
| CN | 104362923 A | 2/2015 |

(Continued)

OTHER PUBLICATIONS

Jan. 8, 2020 Extended Search Report issued in European Patent Application No. 19192472.9.

(Continued)

*Primary Examiner* — Nguyen Tran
(74) *Attorney, Agent, or Firm* — Oliff PLC

(57) ABSTRACT

An electrical converter (203) having an active diode-clamped multilevel topology is shown. Each clamping diode is connected in antiparallel with a switch (S5A, S5B). The converter comprises polyphase supply phases (A, B, C) each of which are connected via a respective phase leg (401, 402, 403) to dc rails (301, 302) and a dc-link capacitor. The dc-link capacitor includes a plurality of series-connected capacitors (404, 405). A controller is configured to, in response to an event signal, for each phase leg, activate a combination of switches therein to form a pair of parallel conduction paths to a midpoint (406) between two capacitors in the dc-link capacitor, thereby connecting each phase to the same node.

16 Claims, 5 Drawing Sheets

(56) References Cited

U.S. PATENT DOCUMENTS

2018/0019684 A1 1/2018 Yamashita et al.
2018/0123495 A1* 5/2018 Baurle ............... H02H 7/0811

FOREIGN PATENT DOCUMENTS

| SE | 521164 C2 | 10/2003 |
|---|---|---|
| WO | 02/31956 A1 | 4/2002 |
| WO | 2015/148977 A1 | 10/2015 |

OTHER PUBLICATIONS

Search Report of the United Kingdom Intellectual Property Office for GB1815301.5 dated Mar. 20, 2019.
Bruckner, T., Bernet, S., 'Loss Balancing in Three-Level Voltage Source Inverters applying Active NPC Switches', 2001 IEEE 32nd Annual Power Electronics Specialists Conference, (IEEE Cat. No. 01CH37230). doi: 10.1109/besc.2001.954272, 2001, pp. 1135-1140.
Barbosa, P., Steimer, P., Steinke, J., Winkelnkemper, M., Celanovic, N., 'Active-Neutral-Point-Clamped (ANPC) Multilevel Converter Technology', 2005 European Conference on Power Electronics and Applications, EPE Dresden, doi: 10.1109/epe.2005.219713, 2005, pp. 1-10.
Rodriguez, J., Bernet, S., Steimer, P.K., Lizama, I.E., 'A Survey on Neutral-Point-Clamped Inverters', IEEE Transactions on Industrial Electronics, vol. 57, No. 7, doi: 10.1109/tie.2009.2032430, 2010, pp. 2219-2230.
Alwash, M., Sweet, M., Madathil, E., Narayanan, S., Bruce, G., 'Short-Circuit Protection of Power Converters with SiC Current Limiters', 2016 IEEE Energy Conversion Congress and Exposition (ECCE),doi: 10.1109/ecce.2016.7855429, 2016, pp. 1-6.

* cited by examiner

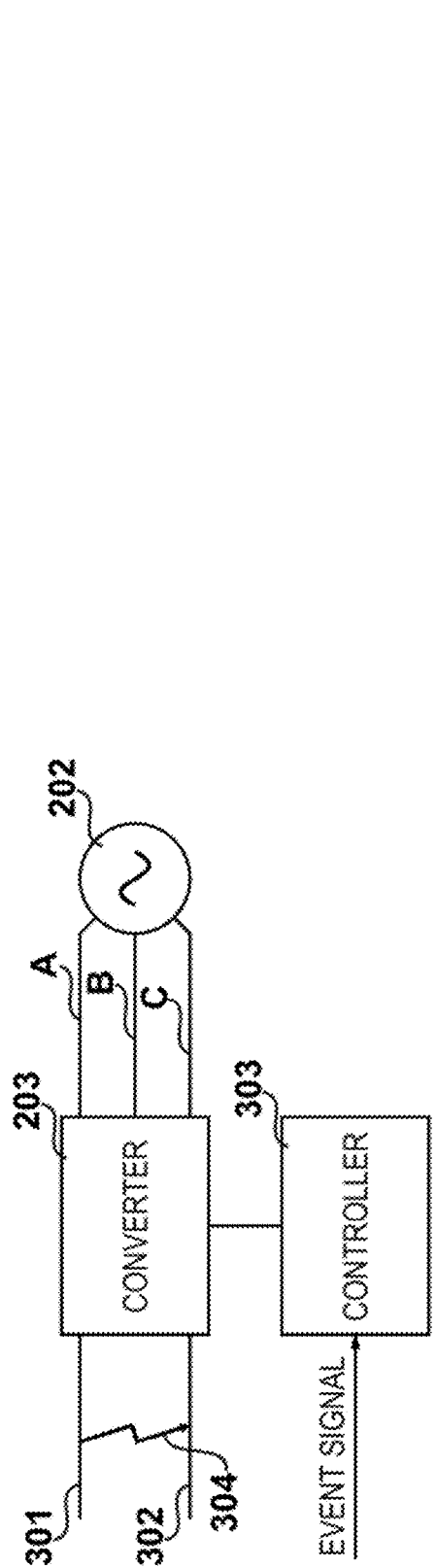
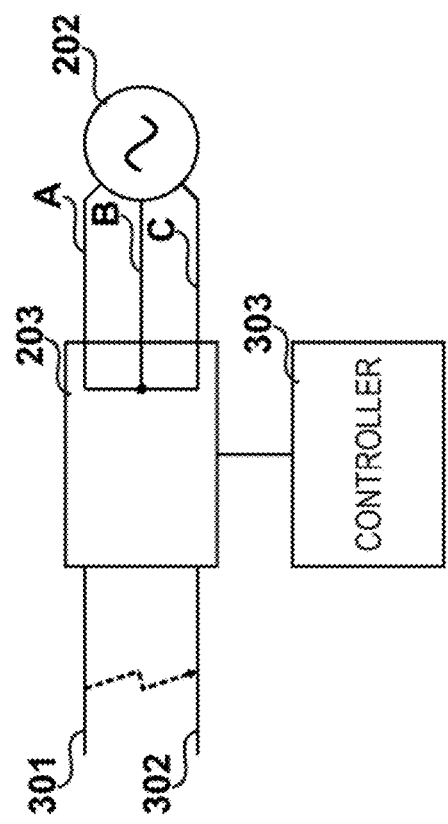
Fig. 3A
Fig. 3B

CONVERTER

CROSS-REFERENCE TO RELATED APPLICATIONS

This application claims the benefit of UK Patent Application No. GB 1815301.5 filed on Sep. 20, 2018, the disclosure of which is herein incorporated by reference in its entirety.

TECHNICAL FIELD

This disclosure concerns electrical converters, which will be understood as embracing rectifiers and inverters.

BACKGROUND

Permanent magnet electrical generators are used for their high efficiency and high power density. Their output is often supplied to a rectifier to produce a direct current output.

One problem with permanent magnet generators is that unless they are physically stopped from rotating, they continue to drive current. This can be an issue if, in the arrangement described above, a fault occurs in the dc network. In many implementations, it is not possible to instantaneously stop the generator from being rotatably driven: either the driving apparatus has a certain degree of angular momentum, or it is not possible for safety reasons or otherwise to mechanically sever the connection between the generator and the driving apparatus.

In such circumstances, it has been a requirement to implement a separate crowbar circuit, in which the approach is to short circuit the phases of the generator. However, such an approach imposes a severe over-current on the power electronics in the rectifier, which cannot be guaranteed to survive the process. This may not be satisfactory in circumstances where, once the dc fault is cleared, the generator is required to be re-connected to the dc network and continue to provide power.

SUMMARY

The invention is directed towards an electrical converter, and controllers and methods of operation therefor.

In one aspect, an electrical converter is provided having an active diode-clamped multilevel topology in which each clamping diode is connected in antiparallel with a switch.

The converter comprises polyphase supply phases each of which are connected via a respective phase leg to dc rails and a dc-link capacitor. The dc-link capacitor including a plurality of series-connected capacitors.

A controller for the converter is configured to, in response to an event signal, for each phase leg, activates a combination of switches therein to form a pair of parallel conduction paths to a midpoint between two capacitors in the dc-link capacitor, thereby connecting each phase to the same node.

In another aspect, a method of controlling such a converter is provided, comprising, for each phase leg, activates a combination of switches therein to form a pair of parallel conduction paths to a midpoint between two capacitors in the dc-link capacitor, thereby connecting each phase to the same node.

BRIEF DESCRIPTION OF THE DRAWINGS

Embodiments will now be described by way of example only with reference to the accompanying drawings, which are purely schematic and not to scale, and in which:

FIGS. 3A and 3B show the generator and electrical converter of FIG. 2 and the controller for the converter;

DETAILED DESCRIPTION

Figure 1:
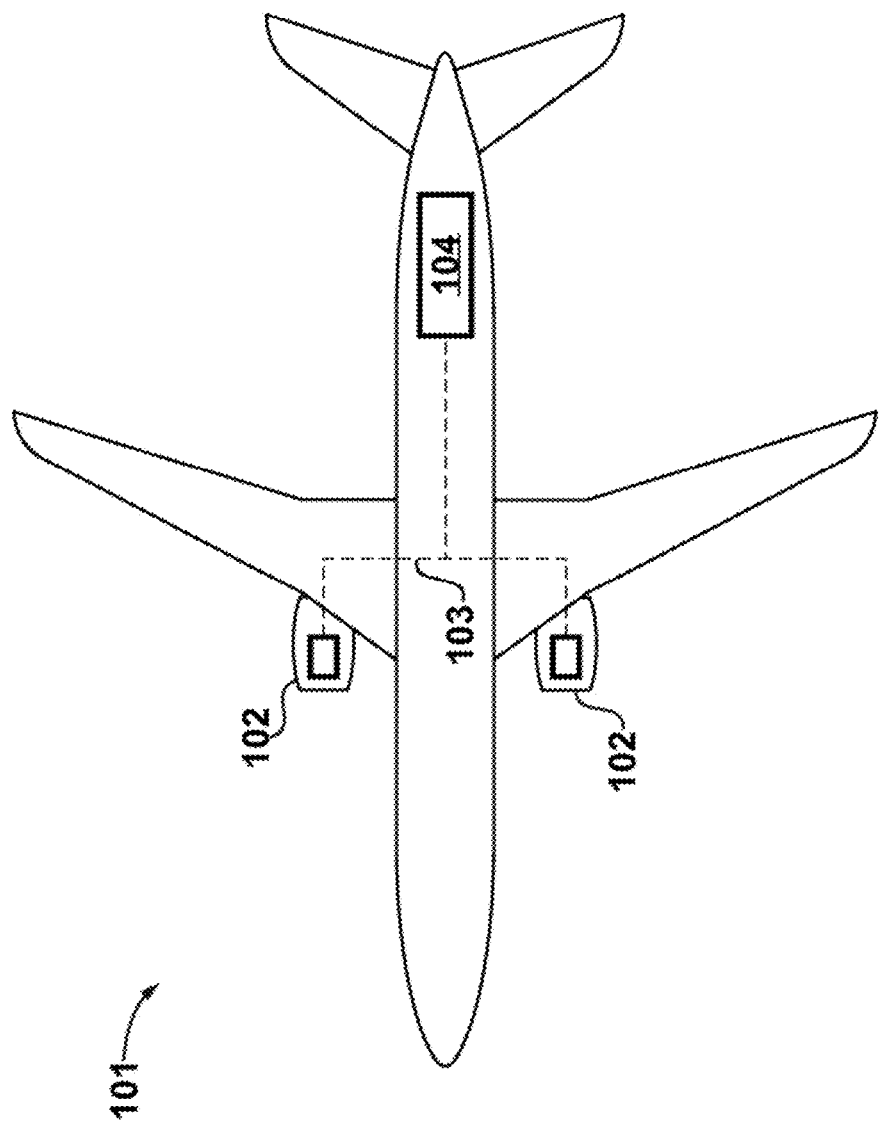
FIG. 1 shows an aircraft having a series-hybrid propulsion system.

An example application of an embodiment is illustrated in FIG. 1. An aircraft 101 is shown in which a series-hybrid propulsion system is employed. A pair of electric propulsion units 102 are installed below the wings of the aircraft 101. The electric propulsion units 102 are connected via a power distribution bus 103 to a source of electrical power located in the fuselage of the aircraft 101. In the present example, the source of electrical power is an internal combustion engine configured to drive an electric machine. In the specific embodiment of FIG. 1, the source of electrical power is turboelectric generator 104, in which the internal combustion engine is a gas turbine engine. In an alternative embodiment, the internal combustion engine may be a piston engine or similar. The source of electrical power could alternatively by a fuel cell, battery, etc.

Each electric propulsion unit 102 includes an electric machine configured to drive a propulsive fan. In the present example, the electric propulsion units 102 are ducted fans, although it will be appreciated that in alternative embodiments the electric propulsion units 102 may be configured as open propellers (a type of propulsive fan), or any other configuration able to produce thrust by causing a pressure rise in the incident airflow.

Figure 2:
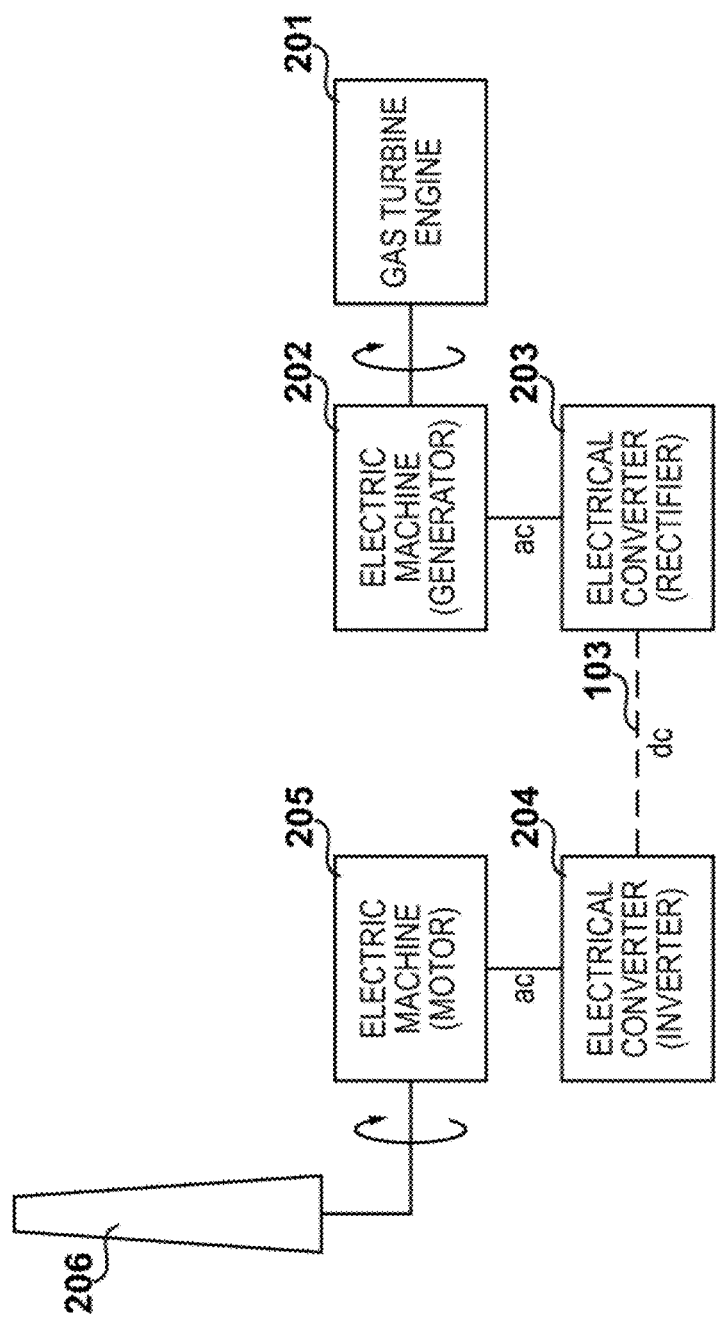
FIG. 2 is a block diagram of the series-hybrid propulsion system of FIG. 1, which includes a generator and an electrical converter.

FIG. 2 is a block diagram of the propulsion system of the aircraft of FIG. 1.

In the present example, therefore, a gas turbine engine 201 drives a first machine 202 operating as a generator via an interconnecting shaft, thus providing a source of electrical power in the form of alternating current. In the present example, the alternating current is converted to direct current for distribution on the bus by way of a first electrical converter 203 operating as a rectifier.

Power is drawn from the bus 103 by a second electrical converter 204 operating as an inverter for supplying a second electric machine 205, which operates as a motor. This in turn drives a propulsive fan 206 via an interconnecting shaft, thereby providing propulsion.

It will be appreciated that depending upon the configuration of the aircraft (for example aircraft 101) further propulsive fans, electric machines and electrical converters may be provided.

In the event of a fault in the dc part of the network, i.e. in the bus 103, it is of course advantageous to be able to isolate the electric machine 202 and converter 203. However, on the basis that it may be possible to clear the fault in the dc part of the network, it is a requirement that the method used to isolate the electric machine 202 and converter 203 be reversible. In the present example, this is to guarantee safety of the aircraft 101. Thus, the electric machine 202 must remain drivingly connected with the gas turbine engine 201, and the converter 203 must remain in a condition to provide continued rectification.

FIGS. 3A and 3B illustrate the approach adopted by the present embodiment of the electrical converter 203. As shown in FIG. 3A, in the present embodiment the electric machine 202 is connected to the converter 203 via a polyphase supply. In the present example, three phases A, B, C are connected with the converter. Being a polyphase supply, each phase is 120 degrees out-of-phase with the other two.

The converter 203 is an active diode-clamped multilevel converter. Such a converter topology is substantially the same as a diode-clamped multilevel converter, except that the clamping diodes are connected in antiparallel with a switch to facilitate load sharing and thus prevent elevated temperatures. The topology of converter 203 will be described in further detail with reference to FIG. 4, and indeed such arrangements will be familiar to those skilled in the art.

The converter 203 produces a dc output between a pair of dc rails 301 and 302. The converter 203 operates under the control of a controller 303, which in the present example is coupled with the switches in the converter 203 to generate a dc output from the polyphase supply. Such standard mode of operation will be understood by those skilled in the art.

In the present example, the controller 303 is a field-programmable gate array (FPGA) having been configured with appropriate control logic (e.g. a hardware description) to operate the converter 203. In alternative embodiments, the controller 303 may instead be an application-specific integrated circuit or a microcontroller, etc.

In the event that a fault 304 occurs on the dc side of the converter 203, an event signal may be received by the controller 303. The generation of such event signals will be within the competence of those skilled in the art.

As illustrated in FIG. 3B, in the present example the controller 303 is configured to, after receiving the event signal, enter the converter 203 into a crowbar mode of operation so as to isolate the electric machine 202 from the dc network. The crowbar mode of operation will be described further with reference to FIG. 4.

Once the fault has been cleared, the controller 303 may return the converter 203 to the normal mode of operation.

Figure 4:
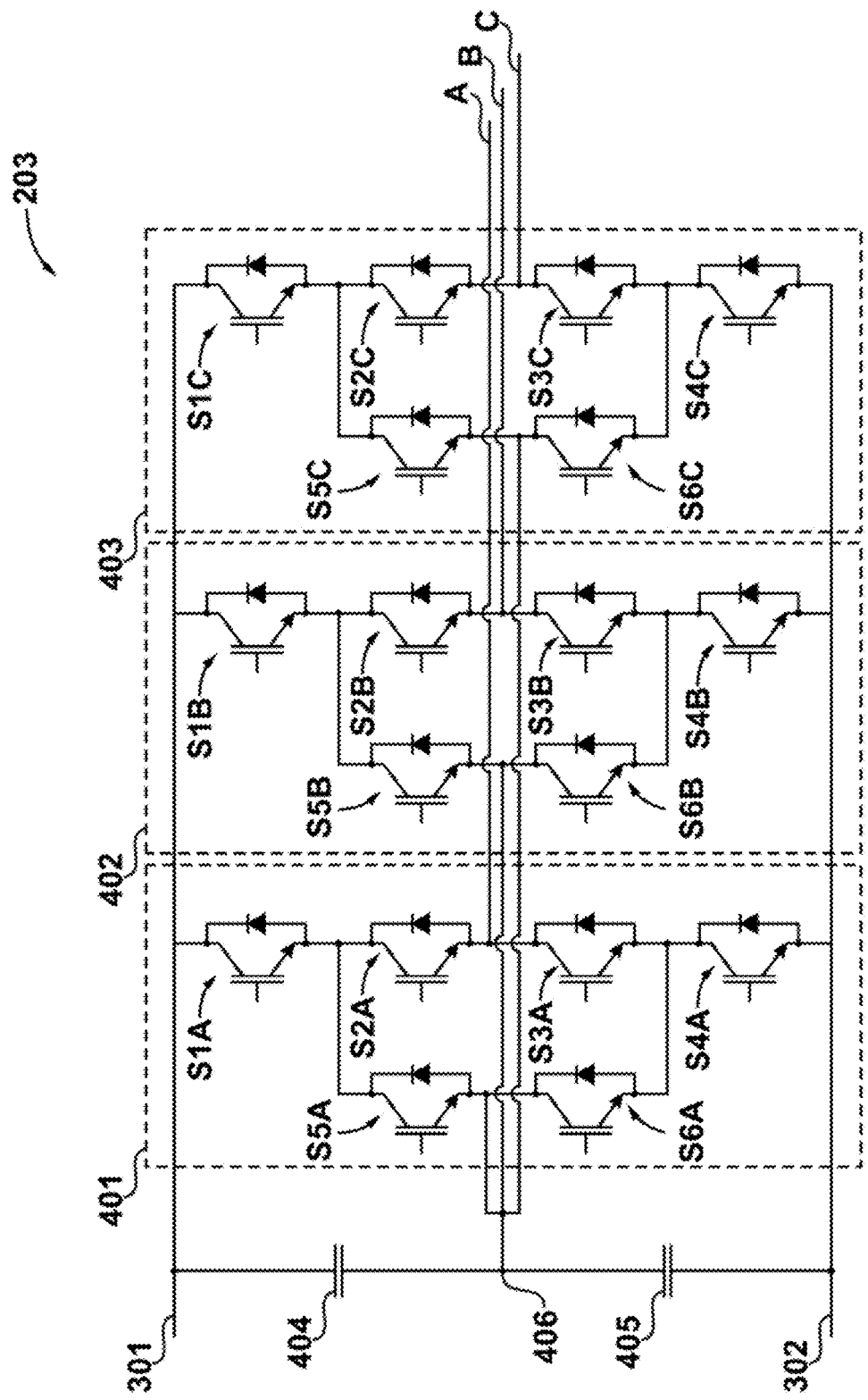
FIG. 4 is a circuit diagram of the converter.

A circuit diagram of a specific embodiment of the converter 203 is shown in FIG. 4.

As described previously, the converter 203 has what is termed active diode-clamped multilevel topology. In such an arrangement, each clamping diode is connected in antiparallel with a switch. As can be seen in FIG. 4, each switch in the converter 203 is provided by an insulated gate bipolar transistor (IGBT). This is due to the high levels of power produced by the electrical machine 202, which in the present embodiment is rated at 2.5 megawatts continuous for propulsion of the aircraft 101. It will be appreciated, however, that other transistors such as BJTs or MOSFETs, or indeed other types of switching devices may be used instead depending upon the intended application of the converter.

The polyphase supply comprising phases A, B, and C are connected via a respective phase leg 401, 402, and 403 to the dc rails 301 and 302. It will be appreciated that other numbers of phases and phase legs may be implemented depending upon the configuration of the electric machine 202.

In the present embodiment, converter 203 is a three-level converter, and so includes a dc-link capacitor comprising two series-connected capacitors 404 and 405. The midpoint 406 between the capacitors 404 and 405 is therefore a neutral point.

It will be appreciated that more than three levels may be provided in other embodiments, for example four or greater. For example, an alternative embodiment of the converter will be described in FIG. 5, in which the converter is a five-level converter. Odd numbers of levels will result in there being one midpoint that is neutral, whilst even numbers of levels will not have a midpoint that is a neutral.

Referring again to FIG. 4, The phase legs each include a plurality of switches composed of an IGBT-antiparallel diode pair, and which are labelled Snp, where n is the number of the switch and p is the attendant phase of the phase leg in which it is located, e.g. S1A is the upper outer IGBT-antiparallel diode pair in phase leg 401. Each leg includes four series-connected IGBT-antiparallel diode pairs {S1p S4p}, and two clamping IGBT-antiparallel diode pairs S5p and S6p.

In normal operation, the controller 303 activates the required combination of switches {S1A S6C} to generate a dc output from the polyphase input. As will be familiar to those skilled in the art, each leg has four possible combinations {O1 ... O4} for connection of the phase to the neutral midpoint node 406. The well-established switch logic for this type of converter topology is set out in Table 1:

TABLE 1

| State | S1p | S2p | S3p | S4p | S5p | S6p |
|-------|-----|-----|-----|-----|-----|-----|
| +     | 1   | 1   | 0   | 0   | 0   | 1   |
| O1    | 0   | 1   | 0   | 0   | 1   | 0   |
| O2    | 0   | 1   | 0   | 1   | 1   | 0   |
| O3    | 1   | 0   | 1   | 0   | 0   | 1   |
| O4    | 0   | 0   | 1   | 0   | 0   | 1   |
| −     | 0   | 0   | 1   | 1   | 1   | 0   |

It will be understood that these current paths are acceptable during normal operation, in terms of not exceeding the rating of the devices in the converter 203.

However, when a fault occurs in the dc network such as described with reference to FIG. 3A, the voltage between the dc rails 301 and 302 nominally becomes zero. This results in a high continuous current flow. For example, in the present embodiment the electric machine 202 is optimised such that it exhibits an inductive impedance of 0.6 per-unit. Given a generated ac voltage of 1 per-unit, this would result in, unchecked, a fault current of 1.67 per-unit which would quickly cause thermal damage in the converter 203.

Thus, in order to implement a crowbar mode of operation (state C), in the present embodiment the controller 303 activates a combination of switches in each phase leg 401, 402, and 403 that forms a pair of parallel conduction paths to the midpoint 406, as set out in Table 2:

TABLE 2

| State | S1p | S2p | S3p | S4p | S5p | S6p |
|-------|-----|-----|-----|-----|-----|-----|
| C     | 0   | 1   | 1   | 0   | 1   | 1   |

In this way, each phase A, B, C is connected to the same node and is thereby isolated from the dc network.

It will be appreciated that the division of current between the two parallel conduction paths means that each path only carries 0.83 per-unit current. Consequently, the converter 203 may remain in this mode of operation indefinitely if required, as the current in any particular device is below its rating. Thus it will be appreciated that this mode of control is particularly advantageous for power conversion from electrical machines having an inductive impedance of from 0.5 to 1 per-unit.

Figure 5:
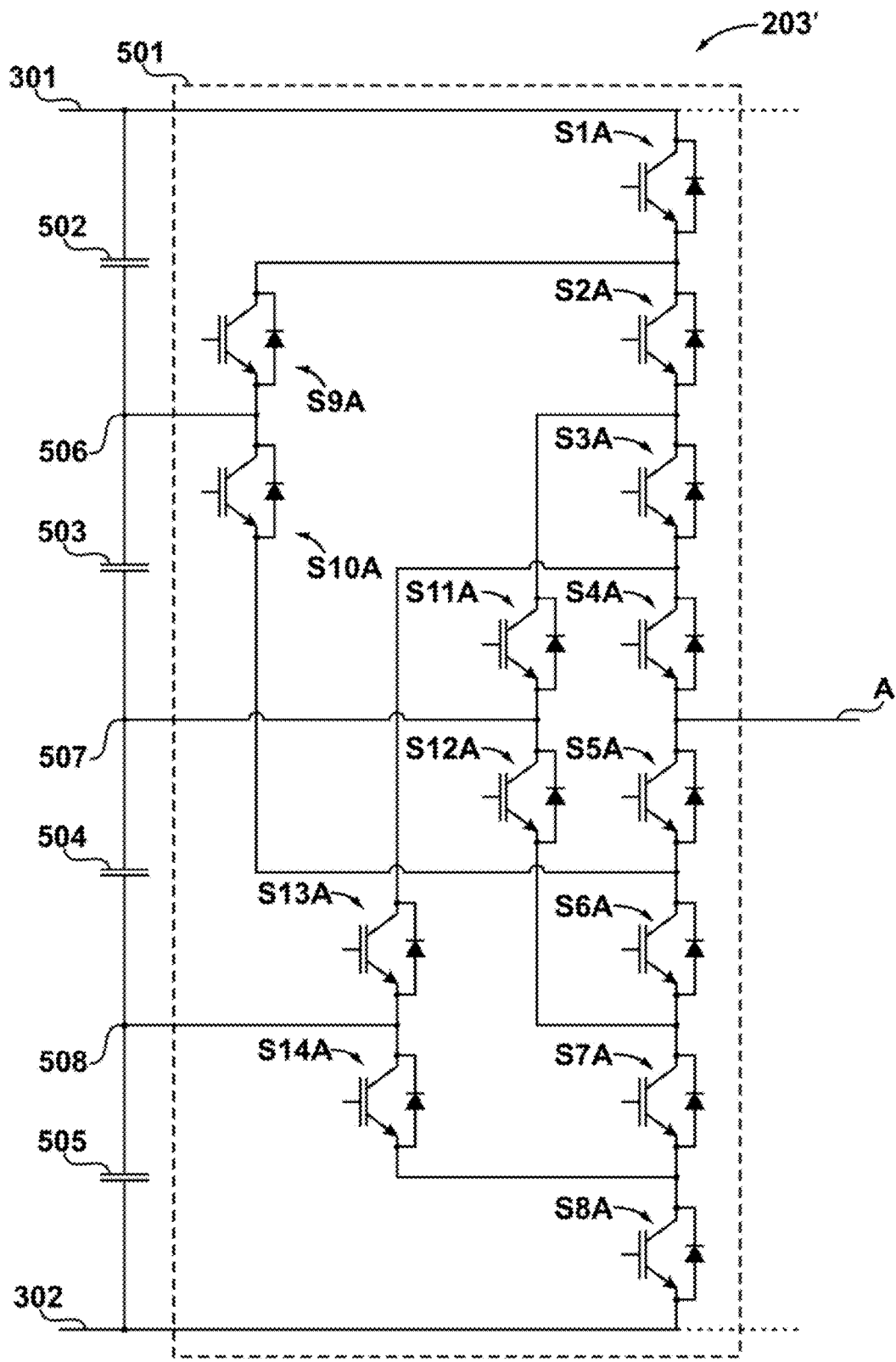
FIG. 5 is a circuit diagram of an alternative embodiment of the converter.

An alternative embodiment of the converter 203 is illustrated in FIG. 5, and is identified by reference numeral 203'. For simplicity, only one phase A and associated phase leg 501 is shown.

The converter 203' has a five-level active diode-clamped topology and thus has a dc-link capacitor between the dc rails 301 and 302 that comprises four series-connected capacitors 502, 503, 504, 505. Three midpoints 506, 507, and 508 are therefore defined at the nodes between any adjacent two of the capacitors 502 to 505.

In a similar way to converter 203, phase leg 501 corresponding to phase A comprises a plurality of series-connected IGBT-antiparallel diode pairs {S1A S8A} which are connected between the dc rails 301 and 302. The connection with phase A is at a node between IGBT-antiparallel diode pairs S4A and S5A. Upper clamping IGBT-antiparallel diode pair S9A and S10A clamp to midpoint 506, neutral clamping IGBT-antiparallel diode pair S11A and S12A clamp to midpoint 507, and lower clamping IGBT-antiparallel diode pair S13A and S14A clamp to midpoint 508. This topology and its normal mode of operation will be understood by those skilled in the art and therefore will not be described further.

There are therefore three different parallel conduction paths that may achieve crowbar operation. The switching states C1, C2, and C3 are set out in Table 3:

TABLE 3

| State | S1p | S2p | S3p | S4p | S5p | S6p | S7p | S8p | S9p | S10p | S11p | S12p | S13p | S14p |
|---|---|---|---|---|---|---|---|---|---|---|---|---|---|---|
| C1 | 0 | 1 | 1 | 1 | 1 | 0 | 0 | 0 | 1 | 1 | 0 | 0 | 0 | 0 |
| C2 | 0 | 0 | 1 | 1 | 1 | 1 | 0 | 0 | 0 | 0 | 1 | 1 | 0 | 0 |
| C3 | 0 | 0 | 0 | 1 | 1 | 1 | 1 | 0 | 0 | 0 | 0 | 0 | 1 | 1 |

In an embodiment, the controller 203 is configured to intermittently switch between the crowbar states C1, C2, and C3. This may be as part of a load balancing strategy. For example, the temperature in some of the activated IGBTs may after a certain time begin to exceed a threshold, for example due to conduction losses therein. In such a case, the present crowbar state, say C1, may be switched for another, say C2 or C3. Such a decision may be taken based upon the temperature of the devices to be activated in the other states (C2 or C3 in this example).

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An electrical converter having an active diode-clamped multilevel topology in which each clamping diode is connected in antiparallel with a switch, the converter comprising:
    polyphase supply phases, each of the polyphase supply phases supplying a polyphase input of alternating current and being connected via a respective phase leg to dc rails and a dc-link capacitor, the dc-link capacitor including a plurality of series-connected capacitors; and
    a controller configured to, in response to an event signal indicative of a fault which has occurred on a dc side of the converter when voltage between the dc rails becomes zero, for each phase leg, activate a combination of switches therein to generate a dc output from the polyphase input and to form a pair of parallel conduction paths to a midpoint between two capacitors in the dc-link capacitor, thereby connecting each phase to a same node and outputting the dc output to the same node and isolating an input of the converter from the dc side of the converter.

2. The electrical converter of claim 1, having three supply phases and three phase legs.

3. The electrical converter of claim 1, in which the multilevel topology is a three-level topology wherein the dc-link capacitor comprises two series-connected capacitors such that the midpoint is a node between the two series-connected capacitors.

4. The electrical converter of claim 1, in which the multilevel topology is at least a four-level topology wherein the dc-link capacitor comprises three or more series-connected capacitors such that the midpoint is a node between any adjacent two of the three or more series-connected capacitors.

5. The electrical converter of claim 4, in which the controller is configured to, for each phase leg, intermittently change between combinations of switches to form different pairs of parallel conduction paths to different midpoints.

6. The electrical converter of claim 1, in which the controller is configured to change between combinations of switches in response to a temperature of at least one of the switches exceeding a threshold value.

7. A controller for an electrical converter of the type having an active diode-clamped multilevel topology in which each clamping diode is connected in antiparallel with a switch, and polyphase supply phases, each of the polyphase supply phases supplying a polyphase input of alternating current and being connected via a respective phase leg to dc rails and a dc-link capacitor, the dc-link capacitor including a plurality of series-connected capacitors, the controller being configured to execute a process comprising:
    in response to an event signal indicative of a fault which has occurred on a dc side of the converter when voltage between the dc rails becomes zero, for each phase leg in the converter, activating a combination of switches therein to generate a dc output from the polyphase input and to form a pair of parallel conduction paths to a midpoint between two capacitors in the dc-link capacitor, thereby connecting each phase to a same node and isolating an input of the converter from the dc side of the converter; and
    outputting the dc output to the same node.

8. The controller of claim 7, in which the multilevel topology is a three-level topology wherein the dc-link capacitor comprises two series-connected capacitors such that the midpoint is a node between the two series-connected capacitors.

9. The controller of claim 7, in which the multilevel topology is a four-or-higher-level topology wherein the dc-link capacitor comprises three or more series-connected capacitors such that the midpoint is a node between any adjacent two of the three or more series-connected capacitors.

10. The controller of claim 9, further configured to, for each phase leg, intermittently change between combinations of switches to form different pairs of parallel conduction paths to different midpoints.

11. The controller of claim 10, in which the controller is configured to change between combinations of switches in response to a temperature of at least one of the switches exceeding a threshold value.

12. A method of operating an electrical converter of the type having an active diode-clamped multilevel topology in which each clamping diode is connected in antiparallel with a switch, and polyphase supply phase, each of the polyphase supply phases supplying a polyphase input of alternating current and being connected via a respective phase leg to dc rails and a dc-link capacitor, the dc-link capacitor including a plurality of series-connected capacitors, the method comprising:

in response to an event signal indicative of a fault which has occurred on a dc side of the converter when voltage between the dc rails becomes zero, for each phase leg in the converter, activating a combination of switches therein to generate a dc output from the polyphase input and to form a pair of parallel conduction paths to a midpoint between two capacitors in the dc-link capacitor, thereby connecting each phase to a same node and isolating an input of the converter from the dc side of the converter; and outputting the dc output to the same node.

13. The method of claim 12, in which the multilevel topology is a three-level topology wherein the dc-link capacitor comprises two series-connected capacitors such that the midpoint is a node between the two series-connected capacitors.

14. The method of claim 12, in which the multilevel topology is a four-or-higher-level topology wherein the dc-link capacitor comprises three or more series-connected capacitors such that the midpoint is a node between any adjacent two of the three or more series-connected capacitors.

15. The method of claim 14, further comprising, for each phase leg, intermittently changing between combinations of switches to form different pairs of parallel conduction paths to different midpoints.

16. The method of claim 15, in which the combinations of switches are changed in response to a temperature of at least one of the switches exceeding a threshold value.

\* \* \* \* \*